United States Patent [19]

Suda et al.

[11] Patent Number: 5,798,087

[45] Date of Patent: Aug. 25, 1998

[54] METHOD OF PRODUCING GYPSUM

[75] Inventors: Taiichiro Suda; Nagatoshi Fujii; Masami Kawasaki; Yoshiko Moriguchi, all of Osaka; Masaki Iijima, Tokyo; Toshikuni Sera, Hiroshima, all of Japan

[73] Assignees: Kansai Electric Power Co., Inc., Osaka; Mitsubishi Jukogyo Kabushiki Kaisha, Tokyo, both of Japan

[21] Appl. No.: 763,295

[22] Filed: Dec. 10, 1996

[30] Foreign Application Priority Data

Dec. 28, 1995 [JP] Japan ............ 7-342577

[51] Int. Cl.$^6$ .................... C01F 11/46
[52] U.S. Cl. .................... 423/555; 423/224; 423/539
[58] Field of Search .................... 423/539, 555, 423/224; 48/127.3

[56] References Cited

U.S. PATENT DOCUMENTS

| 3,807,090 | 4/1974 | Moss | 48/128 |
| 4,305,733 | 12/1981 | Scholz et al. | 48/196 R |
| 4,399,112 | 8/1983 | Voirin | 423/230 |
| 5,295,350 | 3/1994 | Child et al. | 60/39.02 |

FOREIGN PATENT DOCUMENTS

| 2153098 | 4/1972 | Germany | 423/555 |
| 5096492 | 7/1975 | Japan | 423/555 |
| 53142396 | 12/1978 | Japan | 423/539 |
| 5208815 A | 8/1993 | Japan |  |
| 7-237921 | 9/1995 | Japan |  |
| 7237921 A | 9/1995 | Japan |  |
| 86-07396 | 12/1986 | WIPO |  |
| 93-25751 | 12/1993 | WIPO |  |
| 94-19091 | 9/1994 | WIPO |  |
| WO 95/07750 | 3/1995 | WIPO |  |

OTHER PUBLICATIONS

Olsen "Unit Processes and Principles of Chemical Engineering" D. Van Nostrand Co. Inc., New York; Jul. 1932. pp. 1–3.
European Search Report for Application No. EP 96 30 9092 Dated Apr. 1997.

*Primary Examiner*—Wayne Langel
*Assistant Examiner*—Timothy C. Vanoy
*Attorney, Agent, or Firm*—Foley & Lardner

[57] ABSTRACT

After hydrogenation and desulfurization treatment of raw fuel in the desulfurization unit 1, the product is separated in the acidic gas separator 2 into fuel and a hydrogen sulfide-containing gas, and the hydrogen sulfide-containing gas is subjected to combustion together with air in the catalyst converter 3 thereby converting the hydrogen sulfide completely into sulfur dioxide to give a sulfur dioxide-containing gas, and this sulfur dioxide-containing gas is reacted with limestone powder and air in water in the oxidation and neutralization reactor 4, and the resulting slurry is dehydrated in the gypsum slurry solid/liquid separator 5 and then dried in the gypsum heater 6.

4 Claims, 1 Drawing Sheet

METHOD OF PRODUCING GYPSUM

BACKGROUND OF THE INVENTION

1. Field of the Invention

The present invention relates to a method of producing gypsum by use of a hydrogen sulfide-containing gas formed on the desulfurization of raw fuel such as crude oil, heavy oil, coal.

2. Description of the Related Art

Hydrogen sulfide occurring as by-product by desulfurization of raw fuel such as crude oil, heavy oil, coal is utilized again after converting it into sulfur, sulfuric acid, sodium sulfate, sodium sulfite, magnesium sulfate, calcium sulfate and so on, or is discarded. The amount of recovered sulfur is increasing ever year and this is problematic. The sulfur is used predominantly for production of sulfuric acid, further as a catalyst in the form of sulfur dioxide, chemically formed sulfur or sodium sulfite, and for synthetic fiber, rubber, treatment of pulp, inorganic chemicals, detergents, chemical products and so on. Calcium sulfate is used in a large amount as gypsum in additives for building materials and cement. The demand for gypsum in Japan has reached 9.5 million tons/year (1.77 million tons/year in terms of sulfur), and 4 million tons/year (0.7 million ton/year in terms of sulfur) was imported into Japan and its demand is expected to be increasing as well from now on.

When raw fuel such as crude oil, heavy oil or coal is gasified and desulfurized, the resulting hydrogen sulfide will contain by-products such as carbon dioxide. Therefore, if the hydrogen sulfide is separated with a basic adsorbent from the fuel, hydrogen sulfide containing by-products such as carbon dioxide is recovered. For production of gypsum, therefore, it becomes necessary to use this hydrogen sulfide containing carbon dioxide, that is, a hydrogen sulfide-containing gas, as the starting material.

Under these circumstances, Japanese Patent Provisional Publication 237,921/1995 discloses that after a gas containing sulfur dioxide in high concentration is obtained by combustion of hydrogen sulfite separated from raw fuel, said gas containing sulfur dioxide in high concentration is converted into gypsum slurry by contacting said gas with water slurry and simultaneously supplying calcium carbonate and air to the water slurry, and gypsum is separated as a cake from said gypsum slurry, and this cake is dried using as a heat source the combustion heat generated in the combustion of the hydrogen sulfide.

However, the above Japanese Patent Provisional Publication 237,921/1995 does not disclose that hydrogen sulfide in the range of low to high concentrations, obtained by hydrogenation and desulfurization treatment or partial oxidation treatment of raw fuel and subsequent separation from the fuel, is completely oxidized to produce gypsum.

SUMMARY OF THE INVENTION

The object of the present invention is to provide high-purity gypsum effectively by completely oxidizing hydrogen sulfide in a wide range of concentration, obtained by hydrogenation and desulfurization treatment or partial oxidation treatment of raw fuel and subsequent separation from the fuel.

To achieve this object, the present invention relates to a method of producing gypsum, which comprises the steps of: separating a hydrogen sulfide-containing gas from raw fuel after hydrogenation and desulfurization treatment or partial oxidation treatment of said raw fuel; subjecting said hydrogen sulfide-containing gas to combustion with a catalyst and/or a combustion improver to produce a sulfur dioxide-containing gas; and reacting said sulfur dioxide-containing gas with oxygen and calcium carbonate under wet conditions to produce gypsum.

In the above method of producing gypsum, said catalyst is preferably an oxide of at least one element among Cu, Cr, Fe, Ni, Co, Mn, La, Ba, and Ca.

In the above method of producing gypsum, the combustion heat of said hydrogen sulfide-containing gas can be recovered as steam or warm water.

In the above method of producing gypsum, the combustion heat of said hydrogen sulfide-containing gas can be used as a heat source for drying said gypsum and/or an energy source for generation of electricity.

In the method of producing gypsum according to the present invention, a hydrogen sulfide-containing gas even with a low concentration of hydrogen sulfide can be used to give a sulfur dioxide-containing gas free of hydrogen sulfide and so forth by subjecting the hydrogen sulfide to complete combustion, so high-purity gypsum can be efficiently obtained by reacting said sulfur dioxide-containing gas with oxygen and calcium carbonate under wet conditions.

DETAILED DESCRIPTION OF THE PREFERRED EMBODIMENTS

Figure 1:
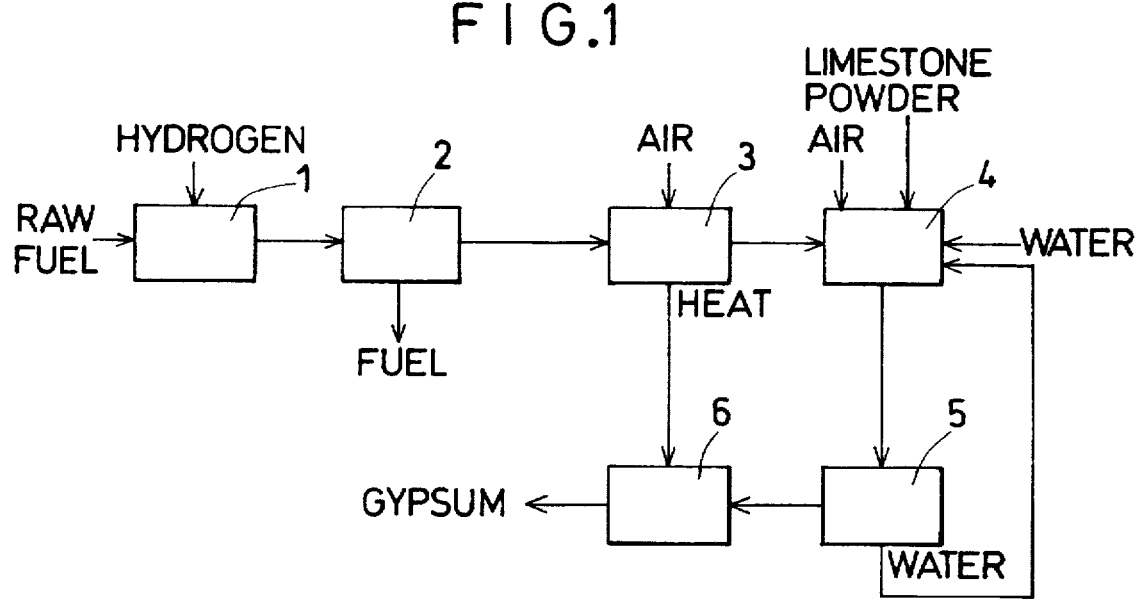
FIG. 1 illustrates one embodiment of the method of producing gypsum according to the present invention.

Hereinafter, the embodiments for carrying out the method of producing gypsum according to the present invention are described by reference to FIG. 1.

The raw fuel used in the present invention includes raw oil, heavy oil, coal, orimulsion, oil sand, oil slurry and so on. Desulfurization treatment means the conversion of the sulfur content in raw fuel into hydrogen sulfide. For this, raw fuel is hydrogenated and desulfurized, for example, in a desulfurization unit 1, or partially oxidized at high temperature. Although in partial oxidization, the carbon content in raw fuel is oxidized into carbon monoxide or carbon dioxide, the sulfur content is converted into hydrogen sulfide without forming any sulfur oxide because this reaction is carried out in a reducing atmosphere. The raw fuel is subjected to hydrogenation and desulfurization treatment or partial oxidization treatment, and then separated into a hydrogen sulfide-containing gas (i.e. hydrogen sulfite containing carbon dioxide etc.) and desulfurized fuel in the acidic gas separator 2 provided with an adsorbent and so forth for selective adsorption of acidic gas. This separation can be carried out using a selective adsorbent such as basic solvent for acidic gas.

Said hydrogen sulfide-containing gas is mixed with oxygen (including an air atmosphere in some cases) and oxidized in a combustion furnace etc. to form sulfur dioxide ($SO_2$). The formed sulfur dioxide is absorbed into water to form sulfurous acid ($H_2SO_3$) and it is further oxidized into sulfuric acid ($H_2SO_4$) by introducing oxygen into this water. The sulfuric acid reacts with calcium carbonate ($CaCO_3$) dispersed in water to form calcium sulfate ($CaSO_4$), i.e. gypsum. However, if oxidation in said desulfurization treatment is insufficient and hydrogen sulfide or sulfur still remains, a sulfurous acid compound or a thiosulfuric acid compound is formed to cause lower purity, and by these impurities the rate of formation of gypsum is lowered.

Particularly in a hydrogen sulfide-containing gas obtained by desulfurization of raw fuel, the hydrogen sulfide content is low because of carbon dioxide and so on mixed in it, and therefore, inadequate oxidation readily occurs and the above-described problem is easily brought about.

Accordingly, a method by completely oxidizing hydrogen sulfide in a wide range of concentration into sulfur dioxide to produce gypsum was established in the present invention. Specifically, a gas containing hydrogen sulfide in a wide range of concentration, obtained by hydrogenation and desulfurization treatment or partial oxidation of raw fuel and subsequent separation from the fuel, is oxidized with a catalyst and/or a combustion improver until no hydrogen sulfide or sulfur remains. That is, hydrogen sulfide in a low to high concentration in said hydrogen sulfide-containing gas is converted into sulfur dioxide by complete oxidation with a catalyst in a catalyst-layer converter 3. The concentration of hydrogen sulfide present in the hydrogen sulfide-containing gas suffices at 5% or more, preferably 10% or more.

The catalyst used in oxidation of hydrogen sulfide includes an oxide of at least one element among Cu, Cr, Fe, Ni, Co, Mn, La, Ba, and Ca. Such catalyst can be carried in a carrier for use. The carrier includes silica, alumina, zirconia, cojelite, mullite and so on. The shape of carrier includes granular or honeycomb structure as examples. The catalyst is charged into the catalyst-layer converter 3 for combustion of the hydrogen sulfide-containing gas.

In addition, said hydrogen sulfide-containing gas can be subjected to combustion by addition of a combustion improver to covert it completely into sulfur dioxide. If necessary, said hydrogen sulfide-containing gas is subjected to combustion by addition of a combustion improver, and the resulting gas can be further passed through a catalyst layer to be completely converted into sulfur dioxide. The combustion improver includes combustible gases such as methane, ethane, propane, butane, and city gas. The combustion improver may be blown into the catalyst layer for combustion.

The gas discharged from the outlet of the catalyst-layer converter 3 contains sulfur dioxide resulting from the complete oxidization of hydrogen sulfide and sulfur. The gas from the outlet of this converter 3, that is, a sulfur dioxide-containing gas, is fed to an oxidization and neutralization reactor 4 via a gas blowing tube having an outlet below the surface of the water, and the gas is dispersed and absorbed into the water. For this dispersion, devices for generating fine gas bubbles, such as stationary disperser, arm-rotating disperser, rotary atomizer, are preferably used. To ensure sufficient absorption of the sulfur dioxide-containing gas and its adequate reaction with oxygen and further adequate reaction with calcium carbonate, the outlet for the sulfur-dioxide-containing gas is located preferably in a deeper position, for example 1 meter or more deeper.

In a gaseous phase, sulfur dioxide ($SO_2$) is gradually oxidized by oxygen into sulfur trioxide ($SO_3$), but in an aqueous solution, the oxidization of sulfurous acid into sulfuric acid proceeds instantly. However, because the rate of dissolution of oxygen in the gaseous phase into water is rate-limiting, the sulfurous acid can be oxidized completely into sulfuric acid by dispersing an excess of an oxygen-containing gas in water as fine gas bubbles. Oxygen for the oxidation is generally air, and together with the gas from the combustion step, air is dispersed in the water in the oxidation and neutralization reactor 4 via an air-blowing tube.

The water in the reactor 4 is made strongly acidic due to sulfurous acid occurring by absorption and sulfuric acid formed by oxidation. This strongly acidic water prevents a sulfuric acid gas from being absorbed thereinto, so it should be neutralized with an alkaline substance. By using calcium carbonate as the alkaline substance in the present invention, calcium sulfate is formed and recovered as gypsum.

If the sulfur dioxide-containing gas has contained hydrogen sulfide and sulfur, the following side reaction occurs, and the oxidation of sulfurous acid into sulfuric acid is inhibited by the formed thiosulfuric acid and so on, resulting in a slow rate of formation of gypsum and a decrease in purity of gypsum.

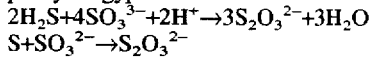

The most economical source of calcium carbonate is limestone. However, calcium oxide and calcium hydroxide can be also used as a neutralizing agent to obtain gypsum. In addition to limestone, calcite and marble can also be used, and a low concentration of lime can be used in some cases for cement. Limestone is preferably used in the form of powder, and it can be directly supplied to the reactor 4 or as slurry after dispersed in water.

The powder of the limestone is dissolved while reacting with sulfuric acid and precipitated as crystals of lime dihydrate ($CaSO_4 \cdot 2H_2O$). The gypsum crystals are plate- and column-shaped and about 100 μm in size. As the crystals are formed, the water in the reactor 4 becomes slurry having crystals of gypsum suspended in it. The amount of limestone supplied is determined depending on the amount of a sulfurous acid gas generated. Usually, the pH in the reactor 4 is detected and limestone is introduced such that the pH is maintained in the weakly acidic range of pH 2 to 7.

In this manner, the sulfurous acid gas is absorbed into water, oxidized, and neutralized with limestone, and a sulfurous acid-free gas is exhausted from the oxidation and neutralization reactor 4.

The amount of gypsum in the reactor 4 is increased with an increasing absorption amount of a sulfurous acid gas, and the concentration of slurry as gypsum is increased. When the concentration of suspended gypsum exceeds 30% by weight, the fluidity of the slurry is decreased and stirring is difficult, and thus part of the slurry is removed and sent to the step of separating gypsum. The amount of the decreased liquid in the reactor 4 is regulated by supplying water. The gypsum slurry removed from the reactor 4 is transferred by e.g. a slurry pump to a gypsum slurry solid/liquid separator 5 where it separated into a gypsum cake and a supernatant by a solid/liquid separation unit such as centrifuge. The supernatant is returned to the reactor 4 as a part of water supplied to the reaction step.

The separated gypsum cake usually contains about 7% water by weight, so it is conveyed to the gypsum heater 6 by a belt conveyer and so on. In the drying step, water of hydration is evaporated by a heater such as drying furnace or a calcination furnace. The gypsum becomes gypsum dehydrate ($CaSO_4 \cdot 2H_2O$), gypsum hemihydrate ($CaSO_4 \cdot \frac{1}{2}H_2O$), or gypsum anhydride ($CaSO_4$), depending on degree of heating. The gypsum dihydrate becomes gypsum hemihydrate by heating at 120°–150° C. The gypsum hemihydrate is called β-type gypsum hemihydrate or calcined gypsum, and it is obtained with high purity of at least 95% by weight, so it can be used by itself a starting material for production of plaster board for building materials.

As the heat source of the above-described gypsum heater 6, the combustion heat of said hydrogen sulfide-containing gas can be utilized. The reaction heat of hydrogen sulfide is 3647 kcal/kg (or 124 kcal/mol of sulfur), and can be effectively utilized as the heating source. In case methane is used as the combustion improver, additional sufficient heat can be recovered and utilized. The means for transmitting the above combustion heat of said hydrogen sulfide-containing gas to the gypsum heater 6 includes a method of recovering the heat as steam or warm water and a method of directly introducing the gas in the combustion step into a heating unit such as a calcination oven or a kiln. The above combustion heat can also be used as an energy source for generation of electricity.

The present invention can be effected in any of batch, semi-batch and continuous systems.

(Example)

The present invention is described below by reference to the following examples.

Example 1

As the raw fuel, orimulsion was used and desulfurized under wet conditions, and it was separated into a hydrogen sulfide-containing gas and fuel by means of an amine-type adsorbent. The composition of the resulting hydrogen sulfide-containing gas is shown in Table 1. For combustion of the hydrogen sulfide-containing gas, a catalyst in which oxide iron had been carried on a carrier consisting of honeycomb-shaped alumina was introduced into a combustion converter, and air was supplied in the ratio shown in Table 1, and the hydrogen sulfide-containing gas was subjected to combustion at a temperature of about 560° C. to give a sulfur dioxide-containing gas. The composition of this sulfur dioxide-containing gas is shown in Table 1.

TABLE 1

|  | Hydrogen sulfide-containing gas | | Combustion air | Sulfur dioxide-containing gas | |
| --- | --- | --- | --- | --- | --- |
|  | vol % | kgmol/h | kgmol/h | vol % | kgmol/h |
| $H_2S$ | 13.70 | 173.0 |  | 0.00 | 0.0 |
| $SO_2$ | 0.00 | 0.0 |  | 5.67 | 173.0 |
| S | trace | trace |  | 0.00 | 0.0 |
| $CO_2$ | 80.50 | 1016.7 |  | 33.41 | 1019.3 |
| CO | 0.20 | 2.5 |  | 0.00 | 0.0 |
| $H_2O$ | 5.38 | 67.9 |  | 7.99 | 243.8 |
| $H_2$ | 0.22 | 2.8 |  | 0.00 | 0.0 |
| $CH_4$ | 0.00 | 0.0 |  | 0.00 | 0.0 |
| $N_2$ | 0.00 | 0.0 | 1563.8 | 51.27 | 1563.8 |
| $O_2$ | 0.00 | 0.0 | 312.8 | 1.66 | 50.5 |
| Total | 100 | 1263.0 | 1876.6 | 100 | 3050.4 |
| Total ($m^3N$/h) |  | 28291.2 | 42035.3 |  | 68330.0 |

As can be seen from Table 1, the concentration of hydrogen sulfide in the hydrogen sulfide-containing gas is as low as about 14%. The sulfur dioxide-containing gas obtained by combustion of the hydrogen sulfide-containing gas did not contain hydrogen sulfide or sulfur because they were oxidized completely into sulfur dioxide.

Then, the sulfur dioxide-containing gas was absorbed into water, oxidized into sulfuric acid by further blowing air, and neutralized with limestone powder, whereby gypsum was produced. When air was blown for 1 hour in the above step, the sulfur dioxide was converted completely into gypsum, and it was not possible to detect thiosulfate and so on as a substance inhibiting oxidation into sulfuric acid. The purity of the gypsum thus obtained was 96% by weight.

To confirm the effect of the present invention, Comparative Example was carried out as follows:

Comparative Example 1

As the raw fuel, orimulsion was used and desulfurized under wet conditions, and it was-separated into a hydrogen sulfide-containing gas and fuel by means of an amine-type adsorbent. The composition of the resulting hydrogen sulfide-containing gas is shown in Table 2. This hydrogen sulfide-containing gas was subjected to combustion using only air. The volume of air supplied is shown in Table 2. The hydrogen sulfide-containing gas was subjected to combustion at a combustion temperature of about 780° C. The composition of the sulfur dioxide-containing gas obtained by combustion is shown in Table 2.

TABLE 2

|  | Hydrogen sulfide-containing gas | | Combustion air, etc | Sulfur dioxide-containing gas | |
| --- | --- | --- | --- | --- | --- |
|  | vol % | kgmol/h | kgmol/h | vol % | kgmol/h |
| $H_2S$ | 13.70 | 173.0 |  | 0.68 | 19.6 |
| $SO_2$ | 0.00 | 0.0 |  | 5.35 | 153.5 |
| S | trace | trace |  | trace | trace |
| $CO_2$ | 80.50 | 1016.7 |  | 35.50 | 1019.3 |
| CO | 0.20 | 2.5 |  | 0.00 | 0.0 |
| $H_2O$ | 5.38 | 67.9 |  | 7.81 | 224.3 |
| $H_2$ | 0.22 | 2.8 |  | 0.00 | 0.0 |
| $CH_4$ | 0.00 | 0.0 |  | 0.00 | 0.0 |
| $N_2$ | 0.00 | 0.0 | 1563.8 | 48.97 | 1406.0 |
| $O_2$ | 0.00 | 0.0 | 312.8 | 1.68 | 48.3 |
| Total | 100 | 1263.0 | 1876.6 | 100 | 2870.8 |
| Total ($m^3N$/h) |  | 28291.2 | 42035.3 |  | 64305.9 |

As can be seen from Table 2, the concentration of hydrogen sulfide in the hydrogen sulfide-containing gas was as low as about 14%, and hydrogen sulfide and sulfur were not completely oxidized and they remained in the sulfur dioxide-containing gas obtained by combustion of the hydrogen sulfide-containing gas with air.

Then, this sulfur dioxide-containing gas was absorbed into water, then oxidized into sulfuric acid by blowing air, and neutralized with limestone powder, whereby gypsum was produced. At this time, thiosulfate ions were formed from the remaining hydrogen sulfide and sulfur, and even if air was passed through the water for 1 hour, the concentration of sulfite ions in the slurry was high, and its oxidation into sulfuric acid was inadequate, so the rate of formation of gypsum was significantly lowered.

We claim:

1. A method of producing gypsum, which comprises the steps of:

subjecting a raw fuel to a hydrogenation and desulfurization treatment or a partial oxidation treatment;

subsequently separating a hydrogen sulfide-containing gas from said raw fuel;

subjecting said hydrogen sulfide-containing gas to combustion in the presence of a catalyst to produce a sulfur dioxide-containing gas, wherein said catalyst is selected from the group consisting of an oxide of Ba and Ca;

and reacting said sulfur dioxide-containing gas with oxygen and calcium carbonate in an aqueous solution to produce gypsum.

2. A method of producing gypsum according to claim 1, further comprising the step of recovering heat from said combustion by transferring to water via heat exchange to result in steam or warm water.

3. A method of producing gypsum according to claim 1, further comprising using the combustion heat of said hydrogen sulfide containing gas as a heat source for drying said gypsum and/or an energy source for generation of electricity.

4. A method of producing gypsum according to claim 1, further comprising the step using the combustion heat of said hydrogen sulfide-containing gas as a heat source for drying said gypsum and/or an energy source for generation of electricity.

* * * * *

UNITED STATES PATENT AND TRADEMARK OFFICE
CERTIFICATE OF CORRECTION

PATENT NO. : 5,798,087
DATED : August 25, 1998
INVENTOR(S) : Taiichiro SUDA et al.

It is certified that error appears in the above-identified patent and that said Letters Patent is hereby corrected as shown below:

On the title page, item [73]

Assignee, insert --The-- before Kansai Electric Power, Co., Inc.

Signed and Sealed this

Nineteenth Day of October, 1999

*Attest:*

Q. TODD DICKINSON

*Attesting Officer*    *Acting Commissioner of Patents and Trademarks*